United States Patent [19]

Ohtsuka et al.

[11] Patent Number: 4,965,747
[45] Date of Patent: Oct. 23, 1990

[54] IMAGE FORMING APPARATUS

[75] Inventors: Yasumasa Ohtsuka, Yokohama; Hiroto Hasegawa, Kawasaki; Koichi Tanigawa, Tokyo, all of Japan

[73] Assignee: Canon Kabushiki Kaisha, Tokyo, Japan

[21] Appl. No.: 347,923

[22] Filed: May 5, 1989

[30] Foreign Application Priority Data

May 10, 1988 [JP] Japan ................................. 63-111644
May 10, 1988 [JP] Japan ................................. 63-111645

[51] Int. Cl.$^5$ .............................................. G06F 9/00
[52] U.S. Cl. ..................................... 364/519; 346/154
[58] Field of Search ........................... 346/154, 139 R; 358/300; 364/518, 519, 520; 400/61, 62, 119, 67, 69

[56] References Cited

U.S. PATENT DOCUMENTS

| 4,387,983 | 6/1983 | Masegi ....................... 355/8 |
| 4,476,474 | 10/1984 | Kitamura ................... 346/160 |
| 4,517,579 | 5/1985 | Kitamura ................... 346/160 |
| 4,816,863 | 3/1989 | Lee ........................... 346/153.1 |

FOREIGN PATENT DOCUMENTS 56-81990 7/1981 Japan ................................. 346/154

Primary Examiner—Arthur G. Evans
Attorney, Agent, or Firm—Fitzpatrick, Cella, Harper & Scinto

[57] ABSTRACT

An electrophotographic process wherein line width is controlled by examining stroke widths of data contained in output information, type of font and other criteria. The control of the electrophotographic process includes control of conditions of electrostatic charge on the dram, exposure or development of a photosensitive body. The electrophotographic process may be controlled in accordance with the font supplied to a printer.

58 Claims, 23 Drawing Sheets

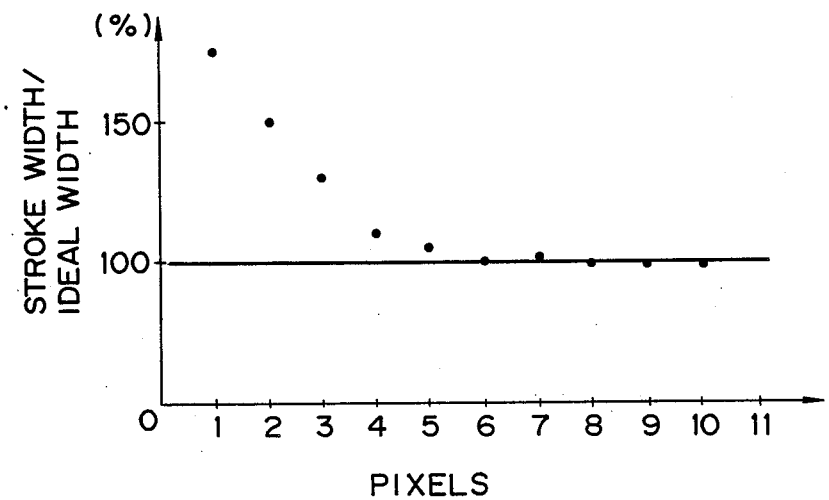
F I G. 1
(PRIOR ART)
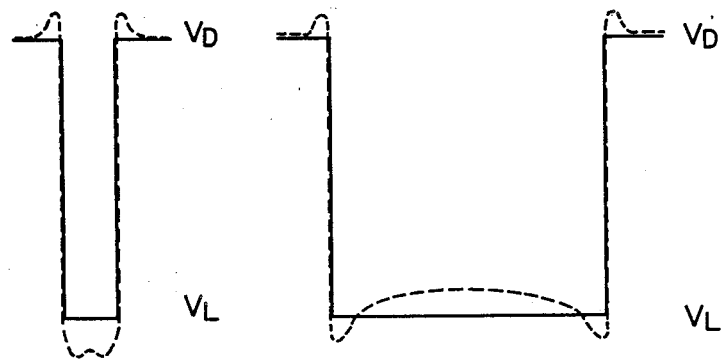
F I G. 2A
(PRIOR ART)
F I G. 2B
(PRIOR ART)

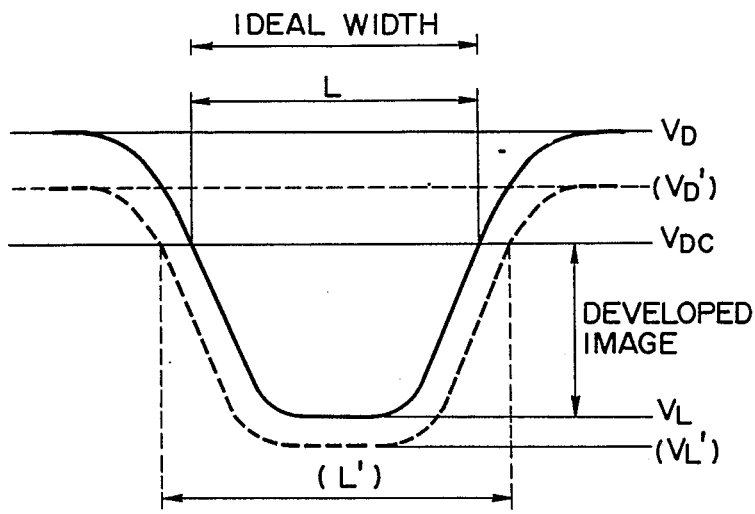
F I G. 11
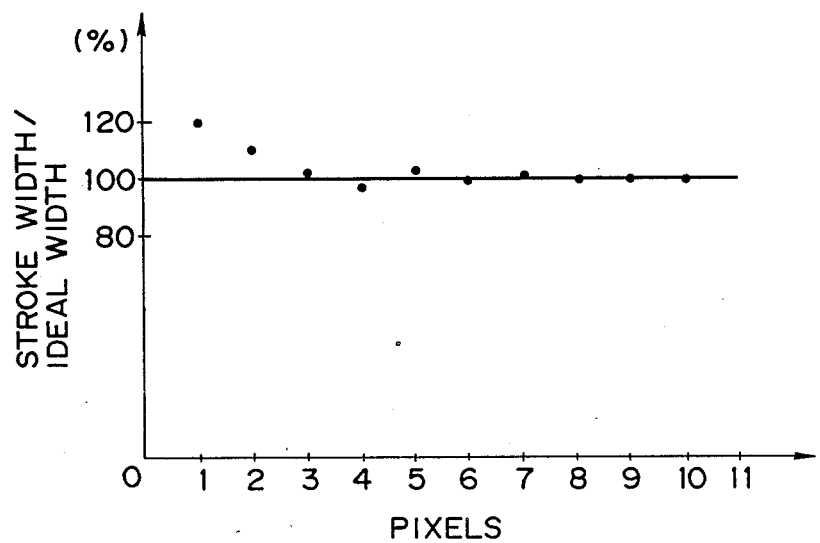
F I G. 12

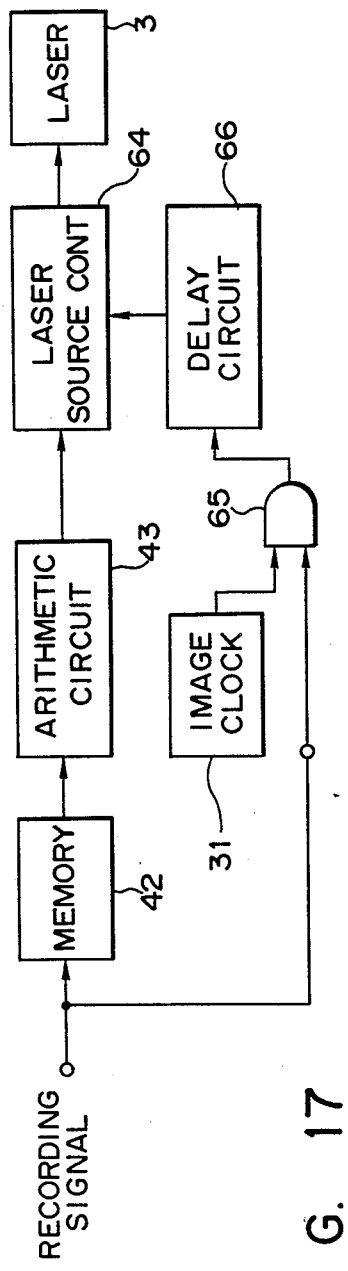
F I G. 17
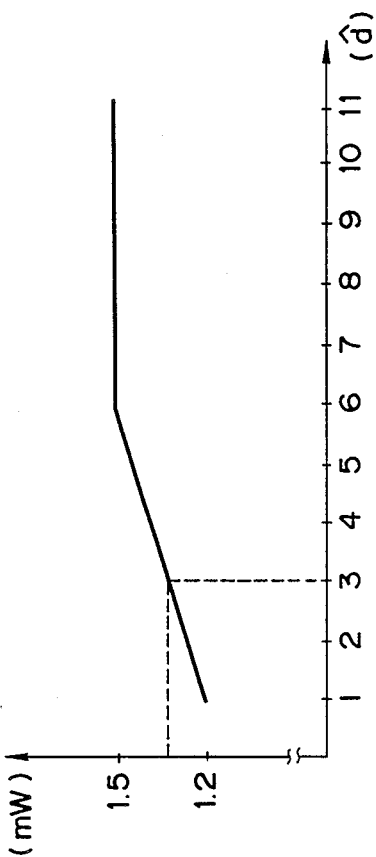
F I G. 18

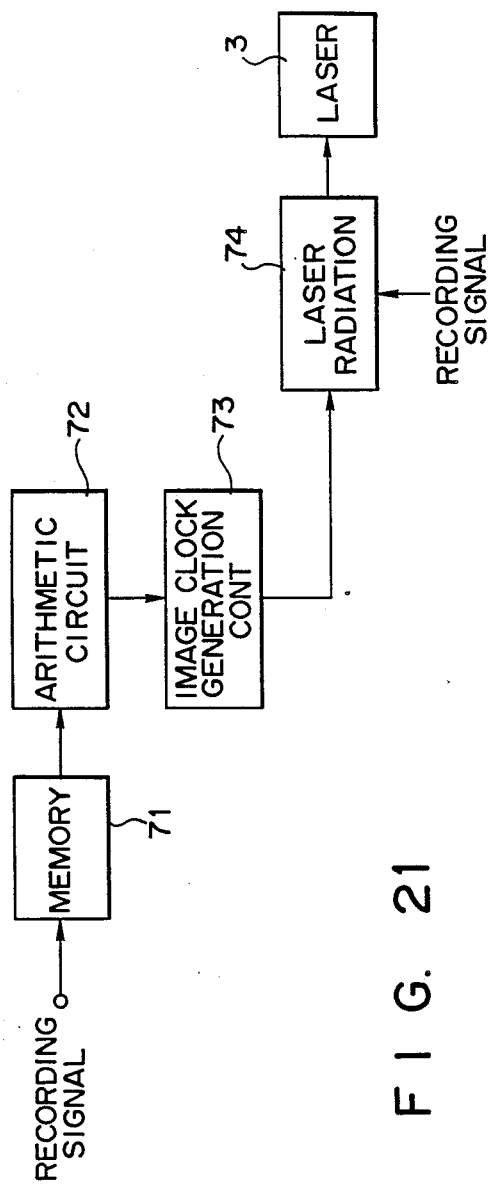
F I G. 21
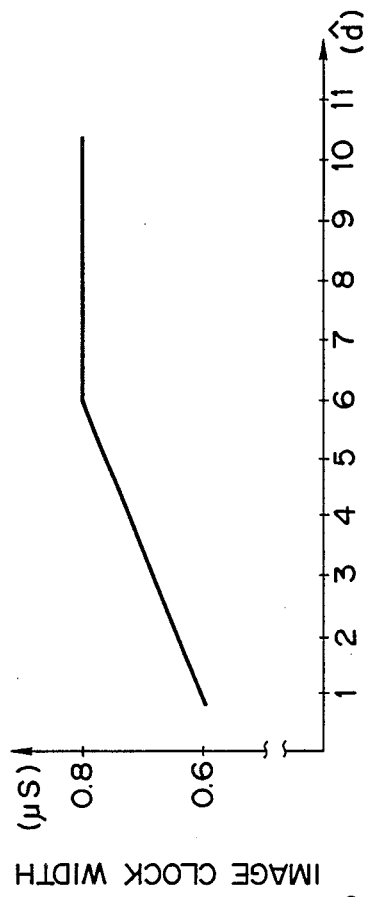
F I G. 22

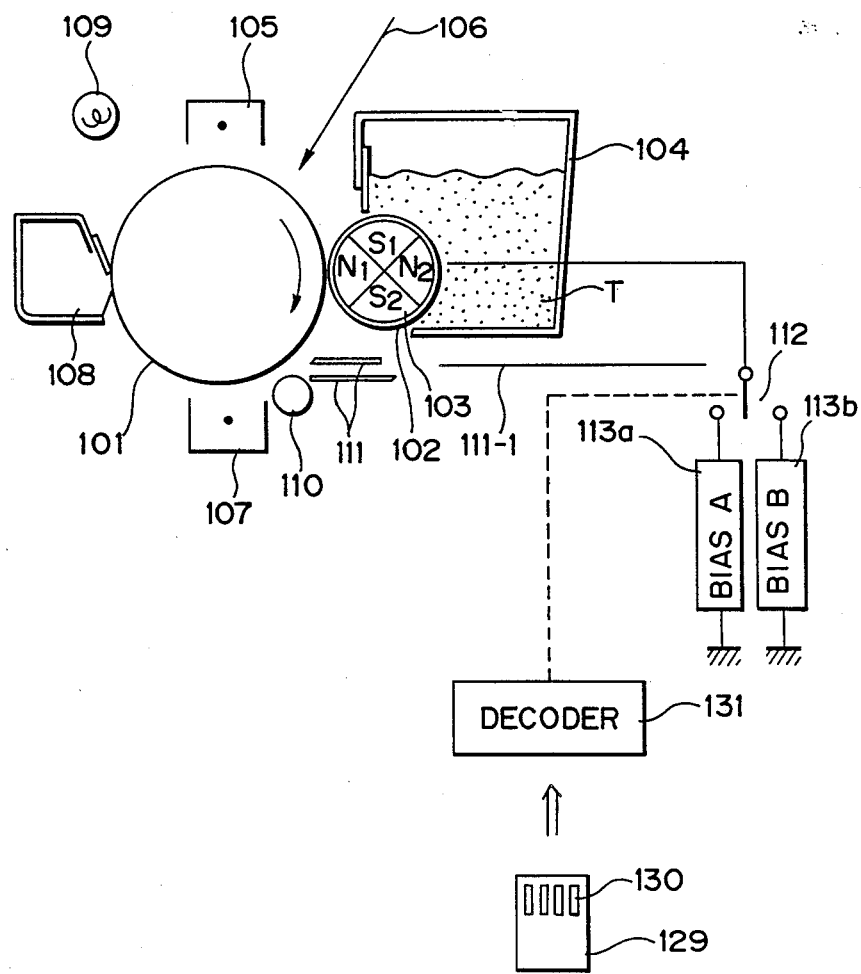
F I G. 26

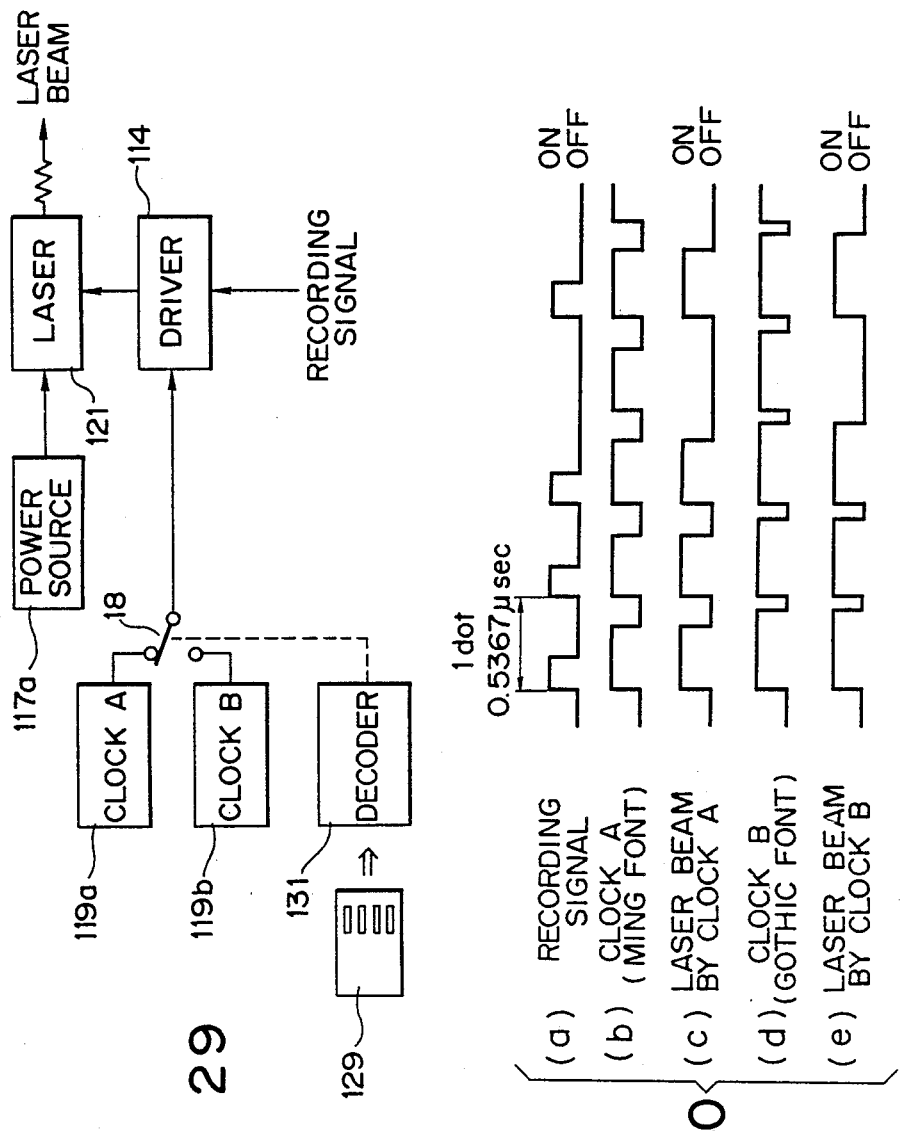

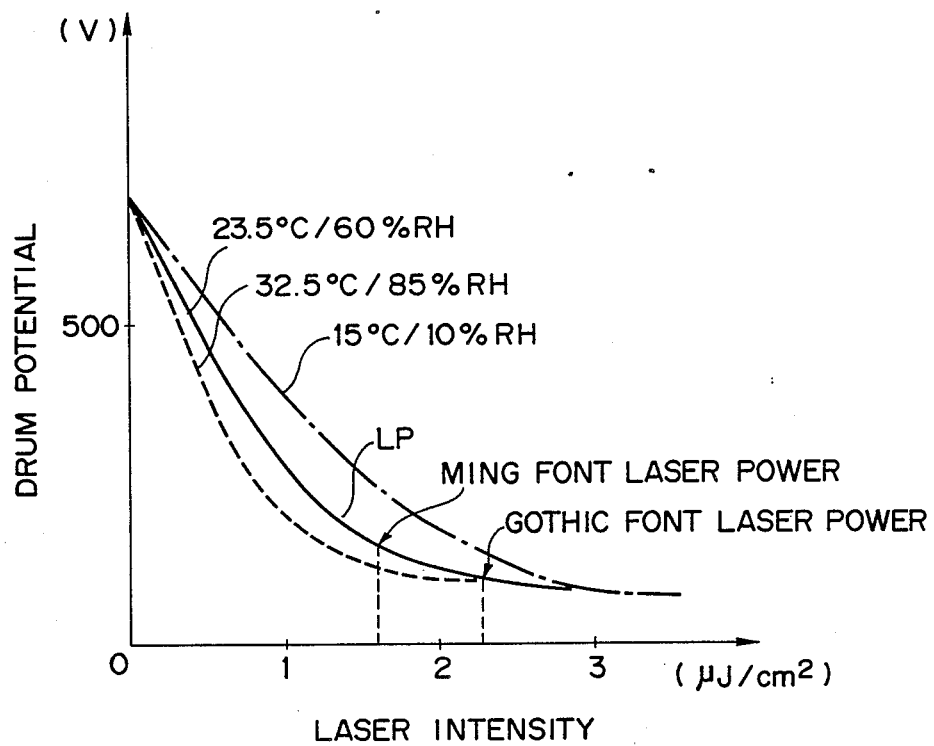
F I G. 31

IMAGE FORMING APPARATUS

BACKGROUND OF THE INVENTION

1. Field of the Invention

The present invention relates to an image forming apparatus which is capable of forming an image based on information which has been input.

2. Prior Art

Printers such as laser beam printers (LBP), LED printers, LCD printers and so forth which utilize an electrophotographic process generally function to form electrostatic latent images on a photosensitive material corresponding to information to be output, develop the electrostatic latent image and transfer the toner image developed to a recording paper.

Since the characteristics of such printers are that it is possible to perform recording of high quality at high speed and on ordinary papers while generating a low level of noise during recording, they are widely used as output devices for text processing devices and image processing devices. In regard to LBP printers, an electrostatic latent image corresponding to recording information is formed on a photosensitive material by scanning it with a laser beam which is modulated by the recording information, on a photosensitive drum uniformly electrified by a primary electrifier. The recorded image can be transferred onto recording paper by developing the electrostatic latent image using a toner and transferring the toner image to the recording paper.

However, such recording devices involve a disadvantage in that the stroke width of the visible image obtained as the final output is greater than that which may be assumed from the viewpoint of electrical signals when the time taken for radiating a laser beam on information to be output is short, as with a fine line. For example, although a fine line with a width corresponding to one pixel ideally has a width of 106 $\mu$ (25.4 mm/240) with a resolution of 240 dpi (dot per inch), the stroke width of one pixel on an image is 180 $\mu$ in some cases. FIG. 1 is a graph representing an example in which deviation from the ideal width value of the stroke width of an image produced by a change in the number of pixels comprising the stroke width is expressed by the percentage obtained by dividing the stroke width of an image by the ideal width value. As can be seen from the graph, when a stroke width 240 dpi comprises 5 pixels or less (corresponding to 530 $\mu$ or less), the lines of the image become thick, and the degree of error increases as the stroke width decreases (in the drawing, 100% corresponds to the ideal value). As shown in FIG. 2, this is because, the electric field changes as shown by the dotted lines in FIG. 2 even if the potential is changed in the manner shown by the solid lines in FIG. 2, the strength of the electric field caused by the electrostatic latent image formed on a photosensitive drum is emphasized at the edges of the latent image.

FIG. 2A shows a change in the width of a line comprising 1 dot, and FIG. 2B shows a change in the width of a line comprising 5 dots. Deviation from the ideal value increases because of the influence of the edge effect as the stroke width decreases. These drawings show a case where a sleeve serving as the development electrode of a developer is close to a photosensitive drum and where the edge effect is initially reduced owing to the approach of the electrode. The drawings also show, however, that the influence of the edge effect on such a small stroke width as described above is not satisfactorily removed.

SUMMARY OF THE INVENTION

One object of the present invention is to provide an image forming device which remedies the above-mentioned disadvantage.

Another object of the present invention is to improve the image forming device.

A further object of the present invention is to provide an image forming device which can output a high quality image reproduction.

Another object of the present invention is to provide an image forming device of simple construction which is capable of outputting a superior image.

A further object of the present invention is to provide an image forming device which is capable of setting the optimum process conditions for the type of image.

Another object of the present invention is to provide an image forming device which is capable of setting the optimum process conditions for the type of font used.

Another object of the present invention is to provide an image forming device which is capable of reproducing a desirable stroke width.

Another object of the present invention is to provide an image forming device which is capable of setting an image forming process to conform to a stroke width.

A further object of the present invention is to provide an image forming device which is capable of setting an image forming process to conform to a type of character.

Other objects and characteristics of the present invention will become clear upon reading the description given below.

BRIEF DESCRIPTION OF THE DRAWINGS

FIG. 1 is a drawing which shows the relationship between the number of pixels comprising a line image and the reproductivity of the stroke width of an image in a conventional device;

FIGS. 2A and 2B are drawings which respectively show the relationship between the potential of the electrostatic latent image of a line image and the electric field in a conventional recording device;

FIG. 11 is a drawing which shows the relationship between the stroke width of an electrostatic latent image and the stroke width of an image in the image forming device in an embodiment of the present invention;

FIG. 12 is a drawing which shows the relationship between the number of pixels forming a line image and the reproductivity of the stroke width of an image in the image forming device in an embodiment of the present invention;

FIG. 17 is a block diagram of the control circuit of a third embodiment of the image forming device in accordance with the present invention;

FIG. 18 is a drawing which shows the relationship between the number d of extract pixels and the laser output in the third embodiment of the present invention;

FIG. 21 is a block diagram of the control circuit in a fourth embodiment of the image forming device in accordance with the present invention;

FIG. 22 is a drawing which shows the relationship between the stroke width and the length of the clock in the fourth embodiment of the present invention;

FIG. 26 is a longitudinal sectional view of the recording unit of LBP in a fifth embodiment to which the present invention is applied;

FIG. 29 is a block diagram of LBP in the eighth embodiment to which the present invention is applied;

FIG. 30 shows timing charts which show the operation of LBP in the eighth embodiment;

FIG. 31 is a drawing of characteristics that shows the relationship between the intensity of a laser beam and the electrostatic potential of a photosensitive drum;

FIG. 36 is a perspective view of another embodiment of a printer body; and a

DETAILED DESCRIPTION OF PREFERRED EMBODIMENTS (Embodiment 1)

Figure 3:
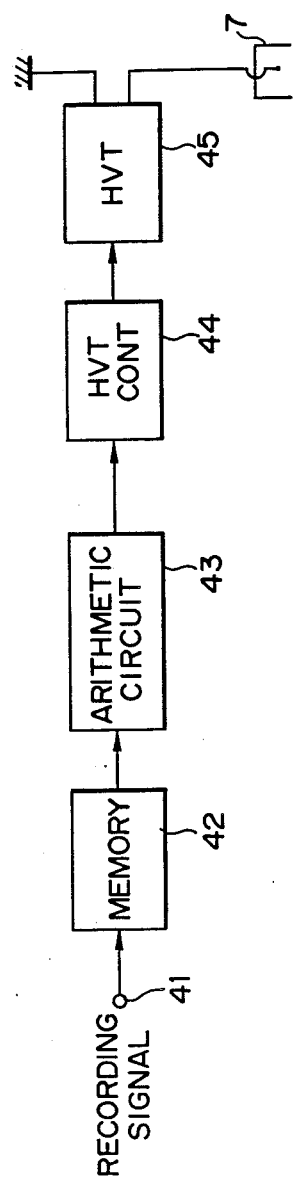
FIG. 3 is a control block diagram of an image forming device in an embodiment of the present invention.
Figure 4:
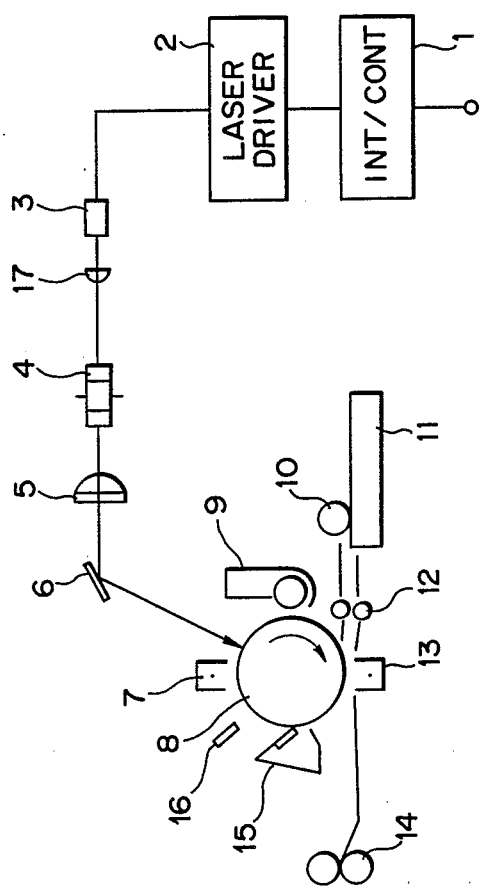
FIG. 4 is a block diagram of a printer which constitutes an image forming device in an embodiment of the present invention.

FIGS. 3 and 4 show a laser beam printer (LBP) to which the present invention is applied.

In FIG. 4, recording information of a character or a picture which is transmitted from a host computer and is converted into an electrical signal is input to an interface controller 1 where a recording signal is separated from it, the recording signal being converted into a driving signal suitable for driving a semiconductor laser 3 in a laser driving circuit 2 and then applied to a semiconductor laser 3.

The semiconductor laser 3 is driven to an on or off state in correspondence with the driving signal, and the laser beam emitted is condensed by a collimeter lens 17 and deflected by being projected on a rotary polygon mirror 4 and then input to a $f\theta$ lens 5 which serves to keep a given scanning speed on a photosensitive drum 8 and to an optical system (not shown) for correcting any deviation of the reflection angle of the reflection plane of the polygon mirror 4. After the laser beam has passed through the optical system and a reflective mirror 6, it is projected on the photosensitive drum 8 so as to scan it in the direction parallel to the rotational axis thereof.

The photosensitive drum 8 is uniformly electrified by a primary electrostatic charger 7 and is then exposed to the laser beam. The charge in the portion of the photosensitive drum 8 to which the laser beam is applied is reduced, while the charge in the portion thereof to which the laser beam is not applied remains. An electrostatic latent image is consequently formed on the photosensitive drum 8 in correspondence with the on or off state of the laser 3. A toner (not shown) is then applied in correspondence with the electrostatic latent image from a developer 9 to form a toner image corresponding to the electrostatic latent image on the photosensitive drum 8. The above-described process represents the process of forming an image.

In FIG. 4, reference numeral 11 denotes a paper supply cassette, and transfer paper (not shown) extracted sheet one after another from the cassette by a paper supply roller 10 is sent to the photosensitive drum 8 synchronously with the developed image formed on the photosensitive drum 8 using a register roller 12. The transfer paper is brought into contact with the photosensitive drum 8 so that the toner image on the photosensitive drum 8 is transferred to the transfer paper by a transfer charger 13. The image on the transfer paper is fixed thereon by a fixer 14. After the transfer process has been completed, any remaining developer is removed from the photosensitive drum 8 by a cleaner 15, and the photosensitive drum 8 is then uniformly exposed to light from a LED array 16 so that the remaining charge is removed for use in the next image forming process.

Figure 5:
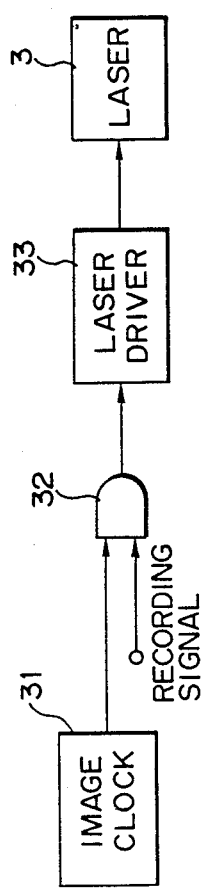
FIG. 5 is a circuit diagram which shows in detail the laser driving circuit shown in FIG. 4.
Figure 6:
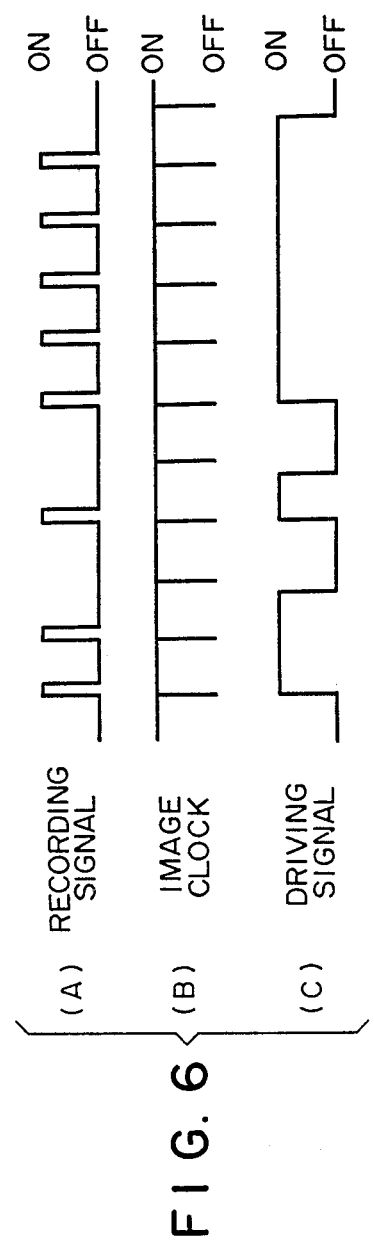
FIG. 6 is a drawing of the waveform of a signal in each of the units of a laser driving circuit.

The laser driving circuit 2 has a configuration such as that shown in FIG. 5 in which the image clock shown in FIG. 6 (B) which is generated from an image clock generating circuit 31 and a recording signal FIG. 6 (A) output from the interface controller 1 are applied to a comparator 32 for production of a driving signal FIG. 6 (C). The driving signal FIG. 6 (C) is amplified to a desired magnitude by a laser radiation circuit 33 and then applied to the laser 3.

The recording signal obtained from the interface controller 1 is input to laser driving circuit 2, applied to the terminal 41 shown in FIG. 3 and then stored in a bit map memory 42. The bit map memory 42 has a capacity sufficient to store dot information corresponding to at least one page and allows for storage of the recording signal (shadowed in FIG. 7) therein. The contents of the memory 42 are subjected to discrimination by an arithmetic circuit 43 where the stroke width with the maximum frequency is calculated, and, when the stroke width of the line image on the bit map comprises n pixels in the longitudinal direction and m pixels in the lateral direction, the width d of the line image is defined by a lower of the values n and m.

A description will now be given of the operation of the arithmetic circuit 43.

Figure 7:
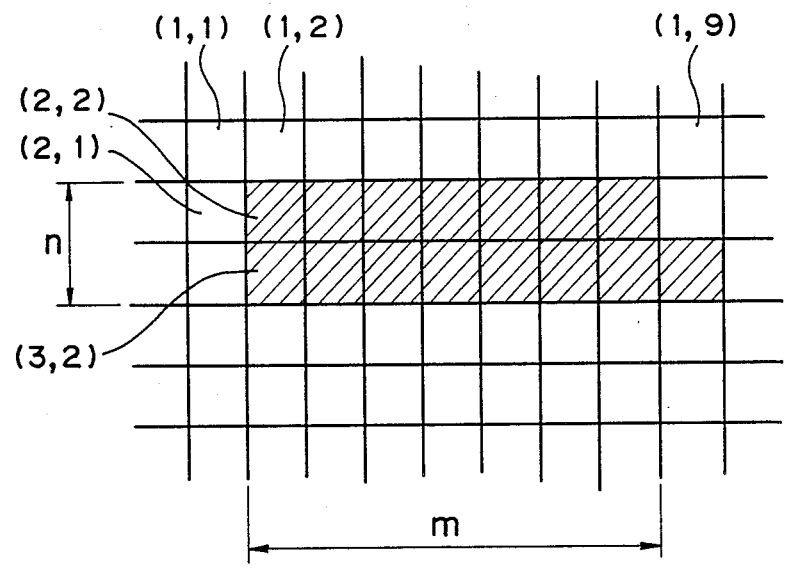
FIG. 7 is a conceptual drawing which shows the line image formed on a bit map.
Figure 8:
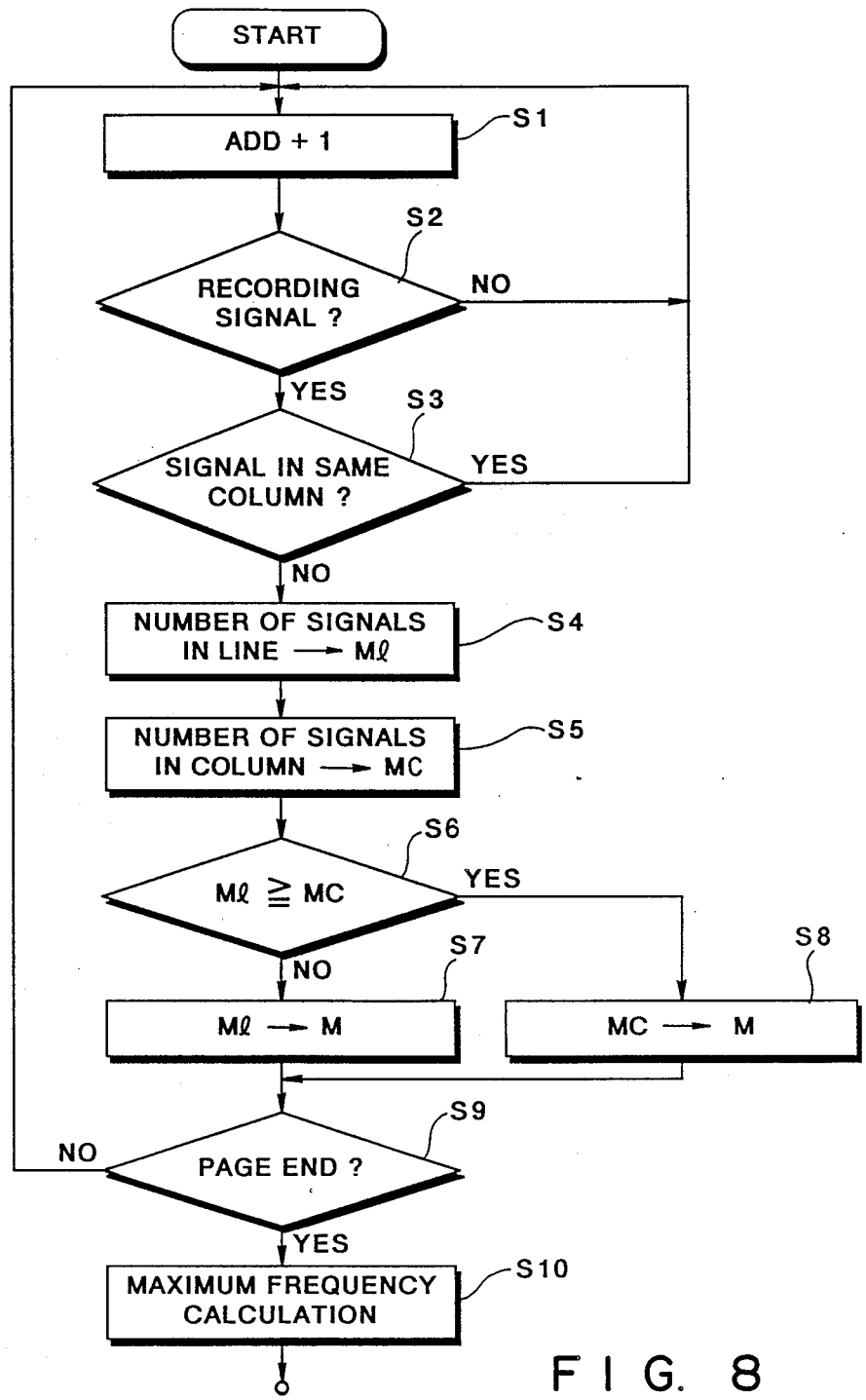
FIG. 8 is a flowchart which shows the control procedure of the arithmetic circuit shown in FIG. 3.

FIG. 8 shows the operational procedure of the arithmetic circuit 43. In Steps S1 and S2, discrimination is conducted to determine whether or not a recording signal is present in the present addresses in the memory 42. If the address (1, 1) shown in FIG. 7 is the present address, the operation is returned to Step 1 in which the address is advanced by one since no signal is present therein, and the same operation as that described above is then performed. After the operation of this line has been completed, the address is advanced to the line 2. At the time the present address is (2, 2), the process is advanced to Step 3 since it is judged that there is a recording signal.

In Step 3, judgement is made as to whether or not a recording signal is present at the address above the present address in the same column. In FIG. 7, if the present address is the address (2, 2), the operation is advanced to Step 4 since there is no recording signal at the address (1, 2) which is above the present address. If the present address is the address (3, 2), the operation is returned to Step 1 in which the present address is advanced by one since there is a recording signal in the address (2, 2) above the present address.

In Step 4, the number of recording signals following the signal at the present address in the direction of the line are calculated, and the thus-calculated value is stored in a register Ml provided in the arithmetic circuit 43. For example, if the present address is (2, 2) as shown in FIG. 7, the number, i.e., 7, of recording signals in the direction of the line is stored in the register Ml. The operation then proceeds to Step 5 in which the number of recording signals in the downward direction of the column is then stored in the register Mc provided in the arithmetic circuit 43. For example, if the present address is (2, 2), the number, i.e., 2, of the recording signals in the downward direction of the column is stored in the register Mc provided in the arithmetic circuit 43, The operation is then advanced to Step 6 in which comparison is made between the numbers stored in the registers Ml and Mc, the smaller value being stored in a memory M in the arithmetic circuit 43. In other words, the value in the register Ml is judged to be smaller and stored in the memory M in Step 7, and the value in the register Mc is judged to be smaller and stored in the memory M in Step 8. The operation is then advanced to Step 9 in which judgement is made as to whether or not the processing for one page has been completed, and if not completed, the operation returns to Step 1 in which the address is advanced by one.

Figure 9:
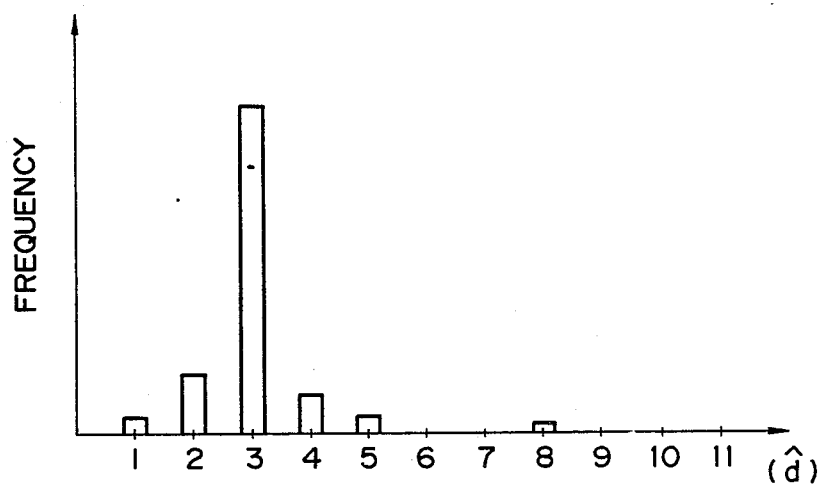
FIG. 9 is a pictograph showing number of dots occurring in sequence to define line width.
Figure 10:
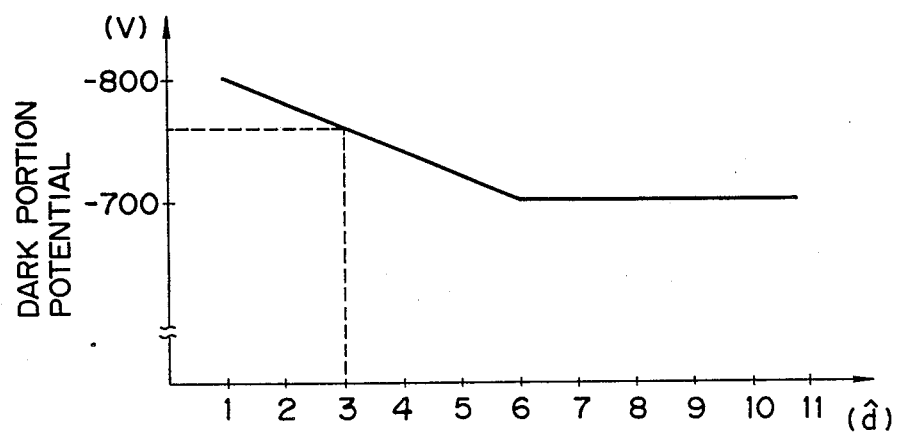
FIG. 10 is a drawing which shows the relationship between the number d of extract pixels and the dark portion potential $V_D$ in the image forming device in an embodiment of the present invention.

Calculation of the number of the dots which follow the above-described central pixel in the line direction and in the column direction is performed for the data on one page. When it is judged that the calculation for one page is completed, the operation is advanced to Step 10 in which the contents registered in the memory M (the memory corresponding to the histogram shown in FIG. 9) are checked and in which the number with the maximum frequency is calculated. This number is output to a high voltage transition controller (HVT) 44. For example, if the numbers in the memory M appear with the frequency for each shown in FIG. 9, the number 3 is latched. This number 3 is sent to the high voltage transition controller (HVT) 44, and the voltage of the dark portion formed on the photosensitive drum 8 is determined from the characteristic curve shown in FIG. 10 (when the maximum frequency d is 3, V = −760 V) by comparison with the table of the characteristic curve provided in a portion of the controller 44, a voltage value VT to be applied to the primary charger also being determined and then applied thereto. In the controller 44, the dark portion voltage (VD) on the photosensitive drum 8 is so set as to be the highest value when the stroke width comprises one pixel and to be constant when the stroke width comprises 6 or more pixels.

FIG. 11 shows the relationship between the stroke widths of the electrostatic latent image and the developed image on the photosensitive drum 8 when the control of the stroke width is performed as described above. In this drawing, $V_D$ denotes a dark portion voltage; $V_L$, a light portion voltage; and $V_{DC}$, a development bias voltage which is a threshold value during development of the latent image. The stroke width ($L_s$) of the developed image shown by the broken lines in FIG. 11 is generally greater than the ideal value (at 240 dip, the L, value of 3 pixel width is 410 $\mu$ which is 129% of the ideal value 317 $\mu$). In an embodiment of the present invention, however, the control of the primary voltage described above enables the achievement of a stroke width L of 320 $\mu$ which is substantially the same as the ideal value. FIG. 12 is a graph in which deviation of the stroke width of the image from the ideal value at the stroke width with the maximum frequency d=3, is shown by the percentage obtained by dividing the stroke width of the image by the ideal value when the number of pixels forming the stroke width is changed. It is found that the stroke width of the image is close to the ideal value even if it is reduced, as compared with FIG. 1.

Although, in this embodiment, the dark portion potential is determined by the stroke width d with the maximum frequency the average stroke width may be calculated, and the high voltage HV may, for example, be determined by this average stroke width.

(Embodiment 2)

Figure 13:
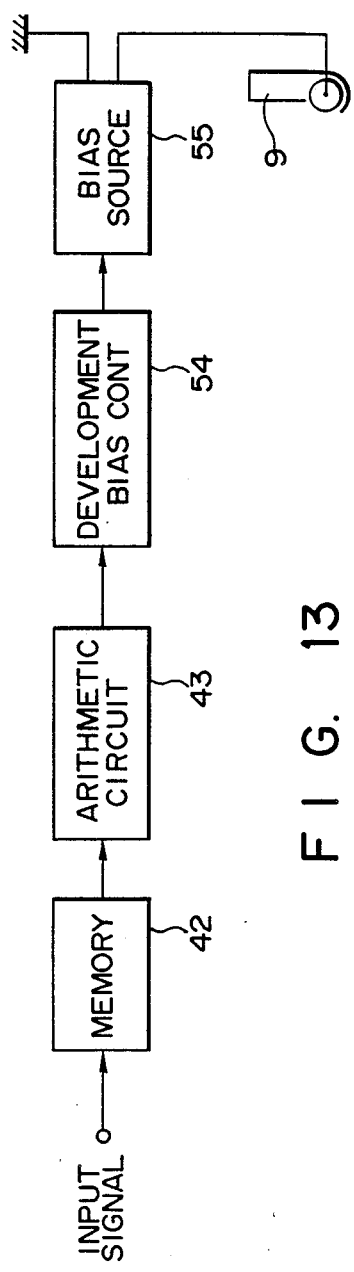
FIG. 13 is a block diagram of the control circuit of a second embodiment of the image forming device in accordance with the present invention.

FIG. 13 shows a second embodiment of the present invention in which the development bias is controlled by using the stroke with the maximum frequency.

Figure 14:
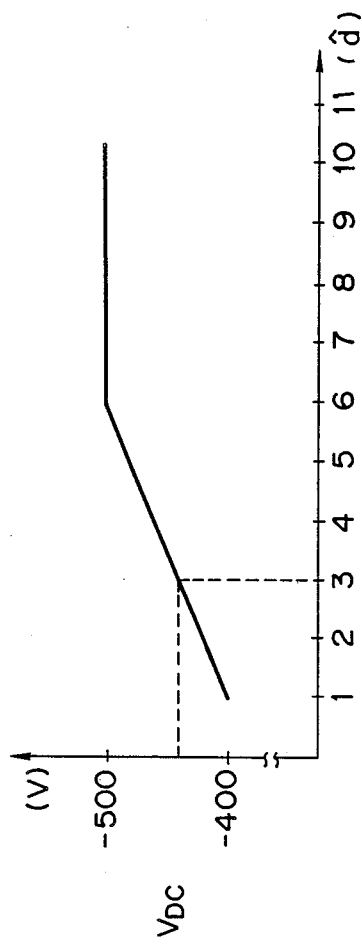
FIG. 14 is a drawing which shows the relationship between the number of extract pixels and the development bias potential in the second embodiment of the present invention.

The stroke width d=3 with the maximum frequency is calculated by the memory 42 and the arithmetic circuit 43 which are the same as those shown in FIG. 3, is latched and then output to a development bias controller 54. The controller 54 is provided with a table of the characteristic curve shown in FIG. 14 so as to control a development bias source 55 in such a manner that $V_{DC} = -440$ V is output from the development bias source 55 when d=3 is input in the controller 54. A voltage $-440$ V is consequently applied as a development bias to the developer 9.

Figure 15:
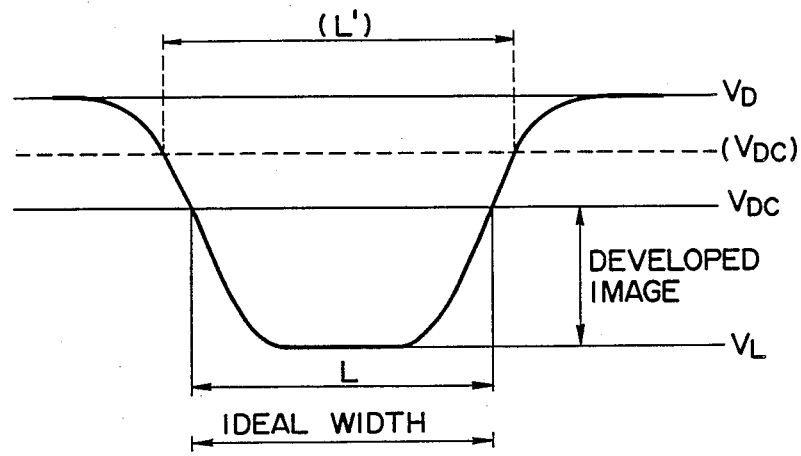
FIG. 15 is a conceptual drawing which shows the stroke widths of an electrostatic latent image and an image in the second embodiment of the present invention.

FIG. 15 shows the relationship between the thusobtained developed image and the electrostatic latent image. In the drawing, the dark portion voltage $V_D$ is $-700$ V and the light portion voltage $V_L$ is $\phi 100$ V. Although the stroke width (L') is greater than the ideal width because a constant development bias $V_{DC}$ is applied regardless of the value of the stroke width, as in conventional methods, a stroke width (L) close to the ideal width is obtained by selecting the development bias $V_{DC}$ in correspondence with the stroke width.

Figure 16:
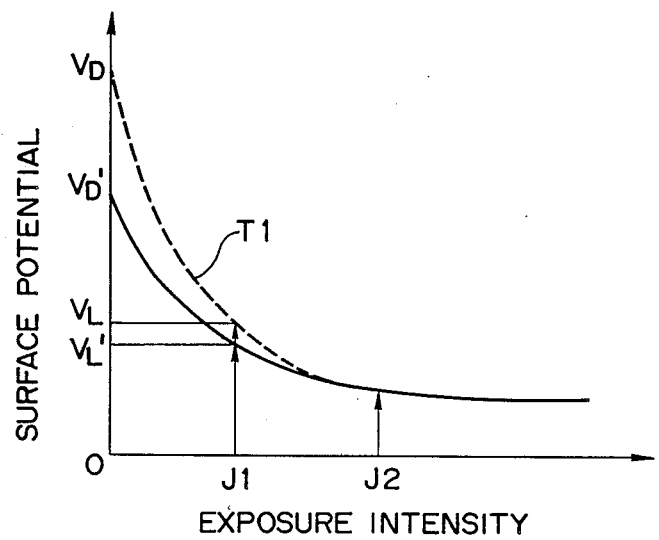
FIG. 16 is a drawing which shows the relationship between exposure and the surface potential of a photosensitive, drum.

In the method of the first embodiment, since the voltage ($V_L$) of the image portion is changed by controlling the primary electrifier, the curved position J1 of the E–J curve of the photosensitive drum 8 shown in FIG. 16 (the symbols shown in FIG. 16 represent the same as those in FIG. 11) must be used. In this case, however, there is a disadvantage in that, when the electrostatic charge conditions are changed as shown by T1 in FIG. 16 owing to the change in the environmental conditions, the light portion voltage $V_L$ is also changed. In addition, the curved portion of the E–J curve is generally easily affected by the deviation in the manufacturing lot of the photosensitive drum 8, and there is thus a tendency that the light portion voltage $V_L$ to becomes unstable. While in the second embodiment, since the substantially flat position J2 of the E–V curve shown in FIG. 16 can be used, the voltage ($V_L$) of the image portion is stable.

Although, in this embodiment, the development bias is determined by the stroke width d with the maximum frequency, for example, and the development may be determined by using the average stroke width calculated for one page.

(Embodiment 3)

FIG. 17 shows a third embodiment of the present invention in which the quantity of light emitted from the laser 3 is controlled in correspondence with the stroke width.

The stroke width with the maximum occurrence is determined by using the memory 42 and the arithmetic circuit 43 in the same way as that employed in the first embodiment, and is input to a laser source controller 64. To the controller 64 is applied the output from the image clock generating circuit 31 and the recording signal, through the delay circuit 66 and the output of the arithmetic circuit 43.

On the other hand, since the characteristic curve shown in FIG. 18 is stored in the form of a table in the laser source controller 64, the current for radiating laser is set in correspondence with the stroke width d with the maximum frequency, and the laser beam with a quantity of light corresponding to the current is applied to the photosensitive drum.

FIG. 18 is a graph which shows the relationship between the value d =n to be input to the laser source controller 64 and the laser output (mW). The characteristic curve shown in FIG. 18 is stored in the form of a table in the controller 64 so that the radiation current is determined by using the table on the basis of the n value input therein. For example, the laser output is 1.32 (mW) at D=3.

Figure 19:
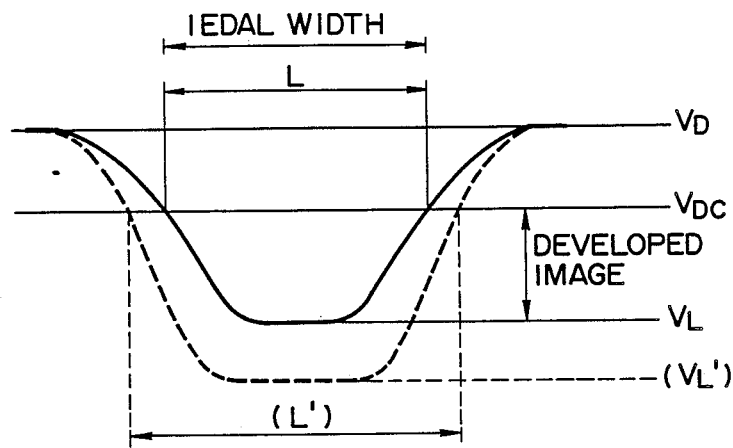
FIG. 19 is a drawing which shows the relationship between the stroke widths of the electrostatic latent image and the image developed in the third embodiment of the present invention.
Figure 20:
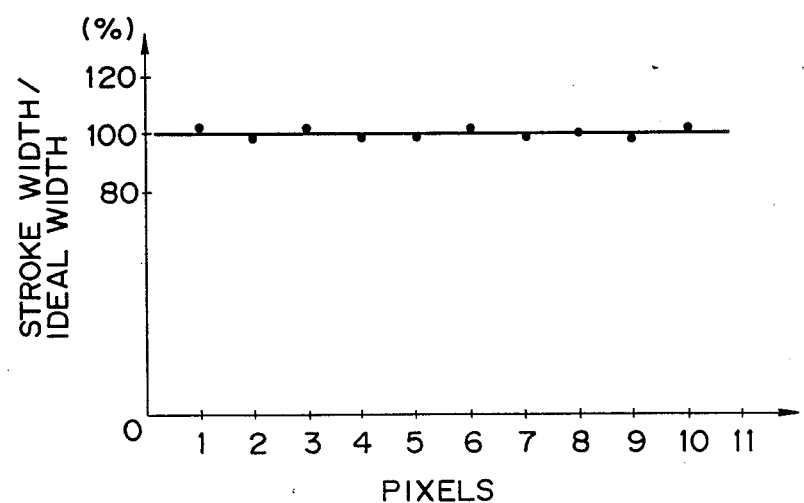
FIG. 20 is a graph which shows the relationship between the number of pixels forming the line image and the reproducibility of the stroke width of the image in the third embodiment of the present invention.

FIG. 19 shows the relationship between the stroke width of the developed image and the electrostatic latent image obtained in this embodiment. When the stroke width is small, the stoke width L, obtained is greater than the ideal width if the electrostatic latent image is formed using a constant quantity of laser beam, as in conventional methods. In this embodiment, however, since the quantity of laser beam is controlled to be a small value, the stroke width L close to the ideal width can be obtained.

FIG. 19 displays the degree to which the actual line width in the image deviates from the ideal line width as a percentage, as in FIG. 12. It is apparent that this is far closer to the ideal value than FIG. 1.

Although, in this embodiment, the light intensity emitted from the laser is determined by the stroke width d with the maximum frequency, for example, and the quantity of light emitted may be determined by using the average stroke width calculated for one page.

Alternatively, the laser output may be controlled by examining the number of pixels which form each line of individual characters or picture elements instead of recording with the same laser beam intensity over one page, as in the third embodiment. In this case, the information on one page is not stored in the memory 42, instead, a line memory (for example, for 6 lines) may be used. The number of scanning lines comprising of pixels to be stored is more that the number (in the above-described embodiment, 5) at which the stroke width deviates from the ideal value in. In this line memory, the number of contiguous pixels each line and column of each picture element which are components of the relevant image region is determined, and the smaller number is output to the laser source controller 64 so that the radiation current calculated by using the abovedescribed table is sent to the laser 3. When the image region comprises of 6 or more continuous pixels, the laser output may be uniformly set to a constant value (in the above-described embodiment, 1.5 mW).

In this way, when the stroke width is controlled by using the intensity of laser beam emitted, no fogging occurs on the image formed because the value of $|V_D - V_{DC}|$ ($V_D$=voltage of the background, $V_{DC}$=development bias voltage) is kept at a constant value.

(Embodiment 4)

FIG. 21 shows a fourth embodiment in which the time for applying laser to one pixel is controlled in correspondence with the stroke width.

Figure 23:
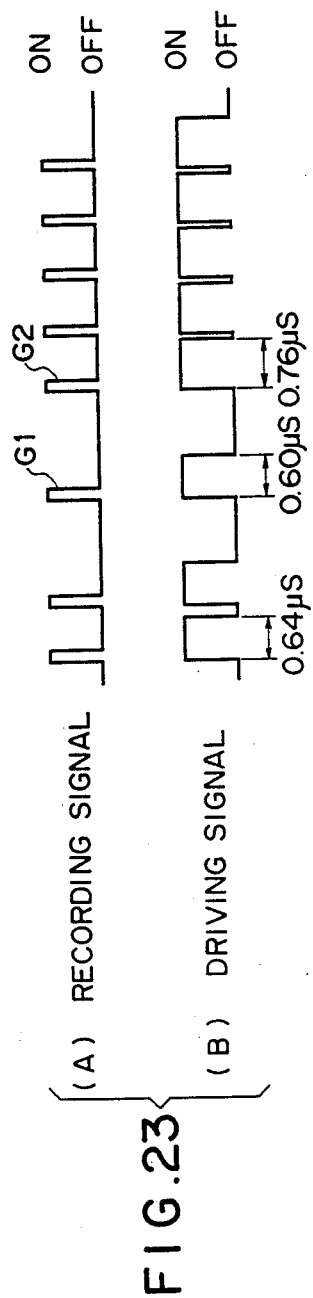
FIGS. 23A and 23B are drawings which respectively shows the image signals and the laser radiation times in the fourth embodiment of the present invention.

In FIG. 21, the recording signal is stored in a memory 71 having a memory capacity of 6 lines, the number of contiguous pixels in each line and column of each of picture elements which are the components of the relevant image region are determined by the arithmetic circuit 72. The smaller number is applied to an image clock generation control circuit 73 in which a table representing the characteristic curve shown in FIG. 22 is stored so that a clock having a pulse length corresponding to the number of pixels forming the line image input therein is generated using the table. This clock is applied to a laser radiation circuit 74, the recording signal being applied to the laser 3 in correspondence with the pulse width of the clock. FIG. 23 (A), (B) shows the recording signal and the laser driving signal which are so controlled that the laser radiation time is as short as 0.6 μS at a point G1 at which the recording signal does not continue, while the time is as long as 0.76 μS at a point G2 at which the recording signal continues.

Figure 24:
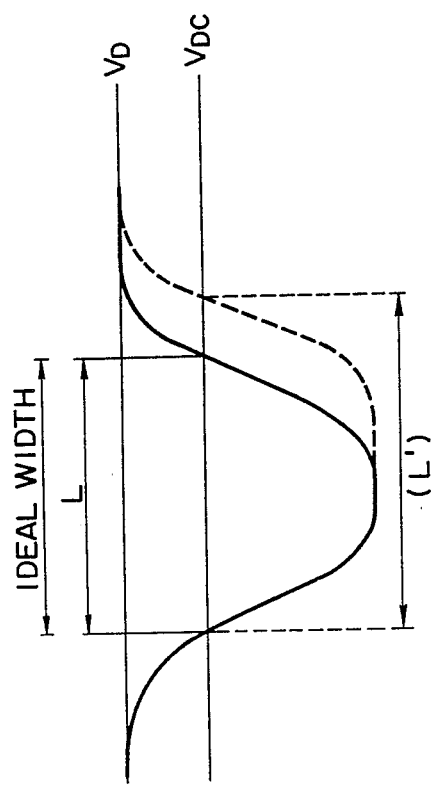
FIG. 24 shows a drawing which shows the relationship between the stroke widths of the image and the electrostatic latent image in the fourth embodiment of the present invention.

FIG. 24 shows the relationship between the stroke width of the developed image and the stroke width of the electrostatic latent image. It is found from the drawing that the stroke width L substantially the same as the ideal width can be obtained by reducing the length of one pulse (shown by the solid line), as compared with the stroke width L' obtained by radiating the laser with a constant pulse length regardless of the continuity of the recording signal (shown by the broken line). Although there is a possibility of deviation in the characteristic curve of the relationship between the value of current used for driving the laser and the laser output depending upon the laser chip used, the constant value of current for driving the laser can be used by controlling the driving time as in this embodiment. This embodiment has the advantage that the control can be performed in a stable state without being affected by deviation in the environment and the laser chip used.

Although each of the embodiments use the arithmetic circuit as a means for determining the stroke width of the input signal, the stroke width may be determined by using the numerical value which is input when the user uses a switch provided in the image forming device in correspondence with the quality of the image, in place of use of the output from the arithmetic circuit. In this case, the control is performed for each page and thus involves an advantage in that it can be realized at a lower cost.

Each of the above-described embodiments concerns the control in such a manner that the stroke width is reduced as the number of pixels decreases, as well as image exposure in which the portion exposed to the laser beam is developed. In the case of the non-linear relationship between the pixel number and the stroke width having a peak of the stroke width at a particular number of pixels, or in the case of background exposure in which the portion that is not exposed to the laser beam is developed, the application of the present invention enables the stroke width to be so controlled as to be close to the ideal value.

Each of the embodiments of the present invention can be applied to printers in which, for example, a fine character is printed with the ideal stroke width.

Description will now be given for embodiments in which an electrophotographic process is controlled in accordance with the character type printed.

(Embodiment 5)

Figure 25:
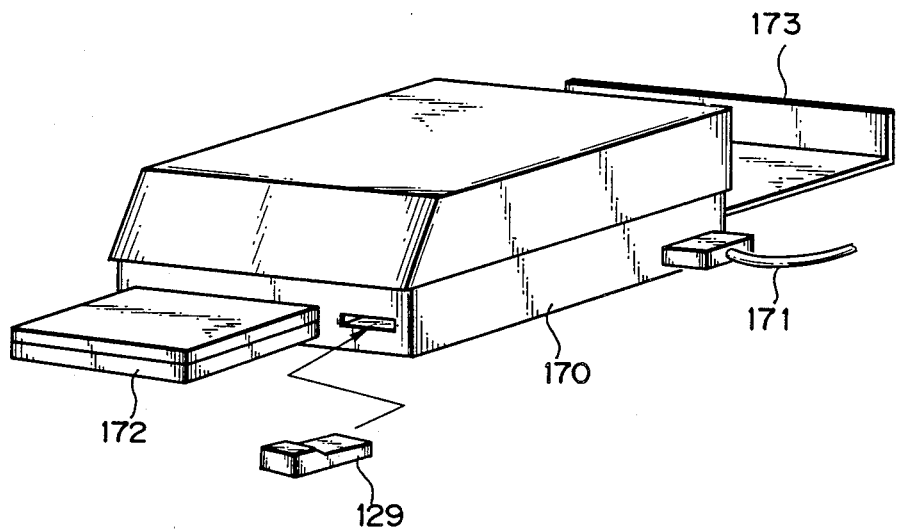
FIG. 25 is an oblique view of a laser beam printer (LBP) which can be used with the present invention.

In FIG. 25, reference numeral 170 denotes an LBP printer body, which can be used with the present invention and the image based on the recording signal supplied from a signal line 171 from an external character processing device is recorded on a recording paper supplied to the body 170 from a recording paper cassette 172. The recording paper on which the image has been completely recorded is discharged onto a taking-off tray 173.

Reference numeral 129 denotes a font cartridge in which Gothic-type characters are stored. Therefore, when the recording signal contains a character code, the character code is recorded as the characters store in the font cartridge 129, e.g., a Gothic character, on the recording paper. A plurality of font cartridges containing different types of characters are previously prepared, and the font cartridge which contains the necessary type of characters is mounted on the body, whereby any desired type of characters can be recorded in accordance with the demand of the operator.

Figure 27:
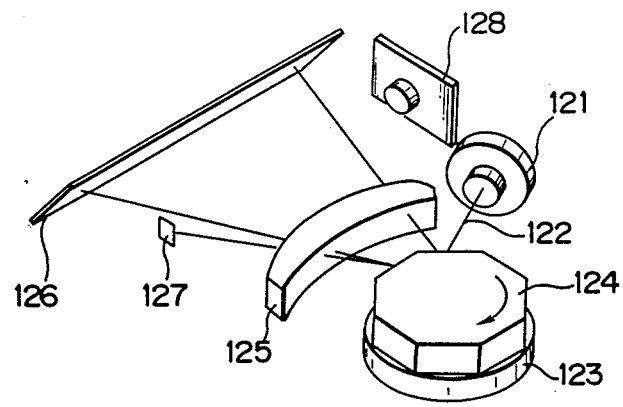
FIG. 27 is a perspective view of the deflection unit for a laser beam in the LBP shown in FIG. 26.

FIGS. 26 and 27 respectively show the recording unit and the laser beam deflection unit which are in the body 170. In FIG. 26, reference numeral 101 denotes a photosensitive drum serving as an image carrier which is uniformly electrified by a primary electrostatic charger 105. An electrostatic latent image is then formed on the photosensitive drum 101 by image exposure 106 using the laser beam modulated in correspondence with the recording signal. The electrostatic latent image is developed using the toner which adheres thereto by the electric field applied between the photosensitive drum 101 and a development sleeve 102 having a magnet 103. On the other hand, a recording paper 111.1 is introduced onto a transfer electrifier 107 by means of a transfer guide 111 and a transfer corona 110.

In this way, the toner image formed on the photosensitive drum 101 is transferred onto the recording paper 111 1 by corona transfer provided on the rear side of the paper 111-1 from the transfer electrifier 107. The toner image transferred to the recording paper 111-1 is fixed onto the recording paper 111.1 by means of a fixing device (not shown). The toner and paper powder remaining untransferred on the photosensitive drum 101 are recovered by a cleaner 108. The charge remaining on the photosensitive drum 101 is removed by exposure using a pre. exposure lamp 109, and the photosensitive drum 101 is again used in the step subsequent to the primary electrostatic charge.

In the above-described configuration, the electric current passing through the photosensitive drum 101 electrified to −700 at the dark portion in the first electrification process and the potential of the portion exposed to the image exposure light 106 is reduced to the light portion potential −100 V.

FIG. 27 is a perspective view of the deflection unit for the laser beam which is applied to the photosensitive drum. A repeated scanning movement is performed from the left to the right as viewed on the drawing using the laser beam 122 which is emitted from a semiconductor laser 121 and is reflected from a polygon mirror 124 which is caused to rotate by a motor 123. The laser beam reflected is passed through a fθ lens 125 which is provided for the purpose of maintaining a constant scanning speed of the laser spot applied on the photosensitive drum 101. Other lenses are not shown in the drawing. The laser beam 122 is finally deflected by a mirror 126 and applied to the photosensitive drum 101 shown in FIG. 26. In order to synchronize the writing position on the photosensitive drum 101 with the recording signal, the beam is deflected by a mirror 127 which is disposed at the end of the width of scanning using the laser beam 122 and is received by a photodetector 128 which generates a synchronizing signal.

It is therefore possible to scan image exposure light 106 on the photosensitive drum 101 by driving the laser 121 using the recording signal.

A developer is provided with a development bias source 113a of a bias voltage A and a development bias source 113b of a bias voltage B one of which is selected by a switch 112. When a fine character such as a Ming font character is desired, the switch 112 is switched so that the development bias A 113a is applied to the sleeve 102 from the bias source 113a. The development bias A113a is set to a dc component of −400 V, and in the case of reversal development, the contrast potential to the light portion potential is 300 V, whereby a thin line can be obtained.

Figure 37A:
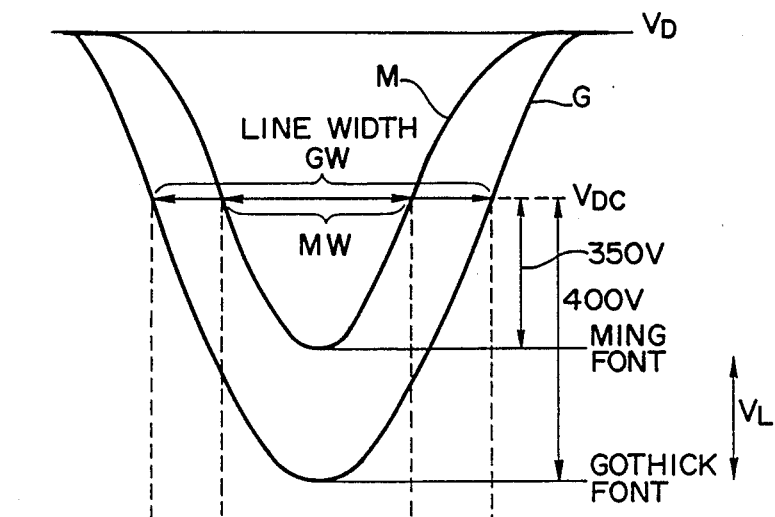
FIGS. 37a, 37b and 38 are drawings for illustrating of characteristics that show the relationship between the electrostatic potentials in a light portion and dark portion on a photosensitive drum and the stroke width.

On the other hand, when a thick line such as a Gothic type is desired, the development bias is switched by using the switch 112 so that a development bias B113b is applied to the sleeve 102. The development bias B113b is set to a dc component of −600 V, the contrast potential to the light portion potential is 500 V, whereby a thick line can be developed. FIG. 37(a) shows the relationship between the latent image potential and the development bias. It is possible to control the line width in such a manner that the line width for the Gothic type is GW and the line width for the Ming font is MW.

In regard to other character fonts, the development bias value may be appropriately set in correspondence with the type of the character concerned.

The development method in each of the above-described embodiments is based on a jumping development method. In all the embodiments, the ac component $V_{pp}$ of the development bias is 1600 V, and a rectangular wave with f=1800 is used.

Figure 32:
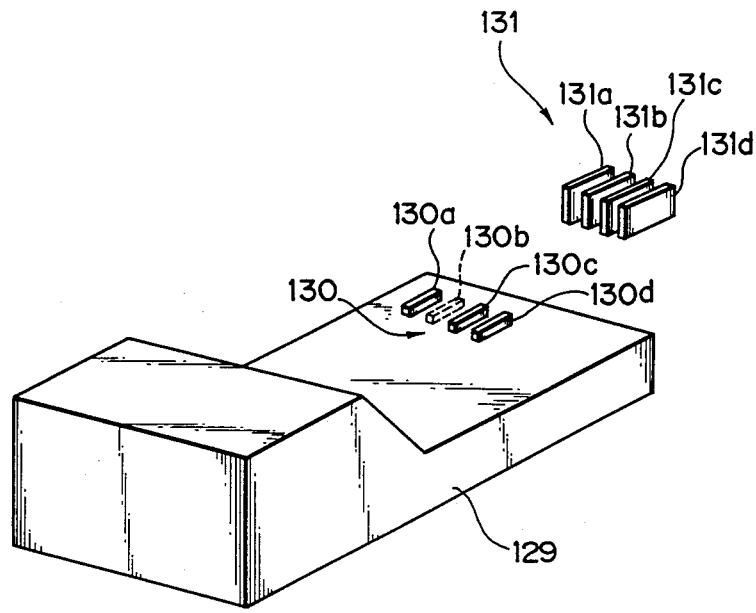
FIG. 32 is a detailed perspective view of the font cartridge shown in FIGS. 25 and 26.

The switch 112 is so designed to be automatically switched on the basis of deciphering coded part 130 provided on the font cartridge 129 inserted into the body using a decoder 131. FIG. 32 shows in detail the coding unit 130 and the decoder 131 in which four projecting pieces 130a to 130d to be coded are provided at the predetermined positions on the cartridge 129 and push the four microswitches 131a to 131d comprising the decoder so as to change the "off" state to the "on" state. It is therefore possible to discriminate at most 16 types of font cartridges by coding the positions at which the projecting pieces are provided and the number thereof in correspondence with the type of the characters stored in the font cartridge.

In the above-described embodiment, each font is developed with an appropriate thickness by changing the dc component of the development bias which is one of the development conditions. However, during development, the width of a pattern may be optimized by changing the peak voltage $V_{pp}$ of the ac component or the frequency f or appropriately selecting the development conditions in combination thereof.

(Embodiment 6)

Figure 34:
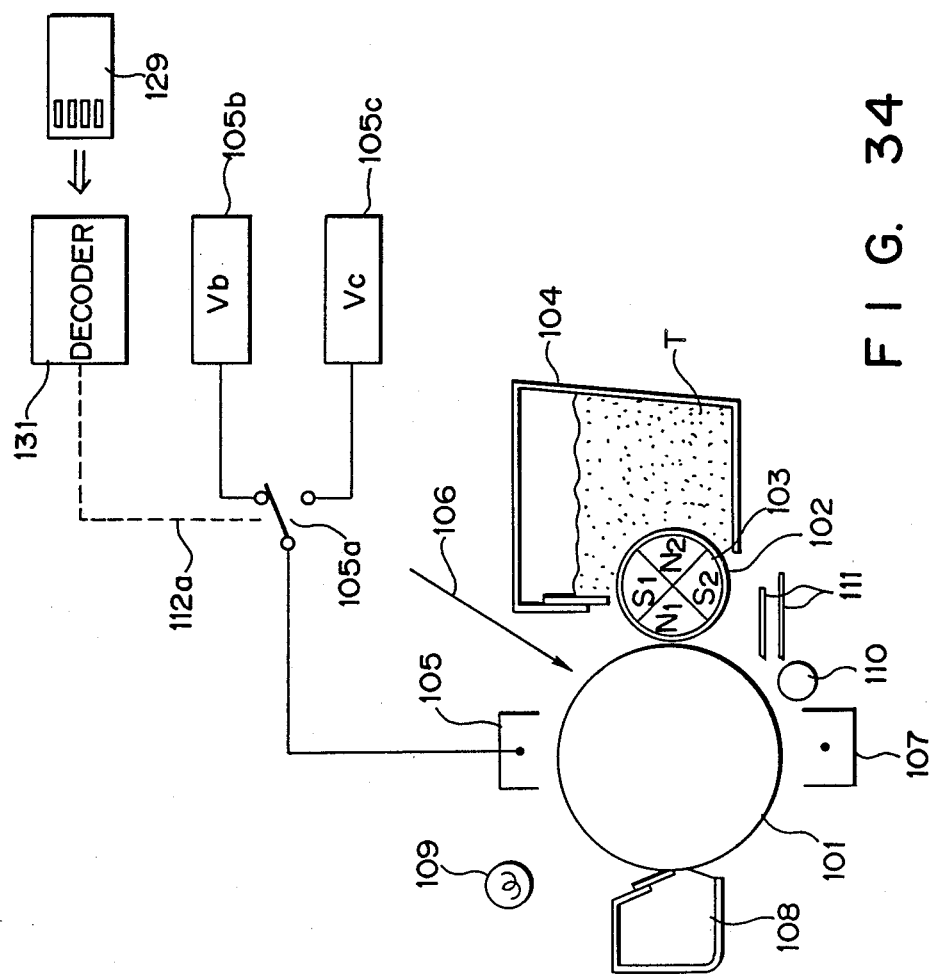
FIG. 34 is a longitudinal sectional view of LBP in a sixth embodiment to which the present invention is applied.
Figure 38:
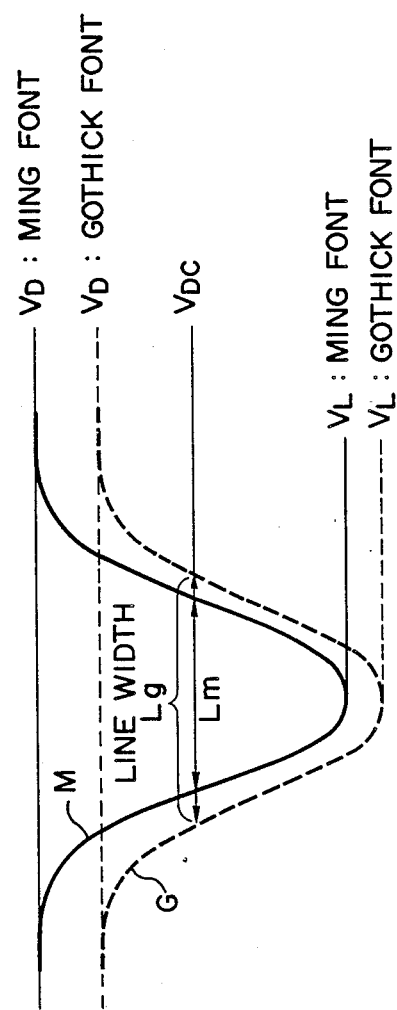

Although, in the above-described embodiment, the stroke width optimum of the font concerned is obtained by changing the development conditions, it is also possible to obtain an optimum pattern by changing the conditions for latent image formation in correspondence with the font (character) type used in the same way as that described above. In other words, a font image is recorded with a stroke width by changing the voltage applied to the primary electrifier 105 corresponding to the font of the character recorded. FIG. 34 shows such an embodiment in which either power source 105b of a voltage Vb or power source 105c of a voltage Vc is selected using a switch 105a which is switched using the output from the decoder 131. The members denoted by the same reference numerals as those shown in FIG. 26 has the same functions as those described in FIG. 26. The voltages Vb and Vc are switched in such a manner that the dark portion potential −700 V and the light portion potential 150 V are obtained when a Ming font is printed, and a dark portion potential −600 V and a light portion potential −100 V are obtained when a Gothic font is printed. In this case, the relationship between the latent image potential and the development bias is that shown in FIG. 38 in which the Ming font possesses a characteristic curve M, and the Gothic type possesses a characteristic curve G, the stroke widths formed being represented by Lm and Lg, respectively. It is thus possible to realize a stroke width in correspondence with each character font.

(Embodiment 7)

The light portion potential may be changed in correspondence with the character font concerned, apart from the above-described embodiment. For example, the voltages may be switched in such a manner that a dark portion potential −700 V and a light portion potential −150 V are obtained for a Ming type font, and a dark portion potential −700 V and a light portion potential −100 V are obtained for a Gothic type font.

Figure 28:
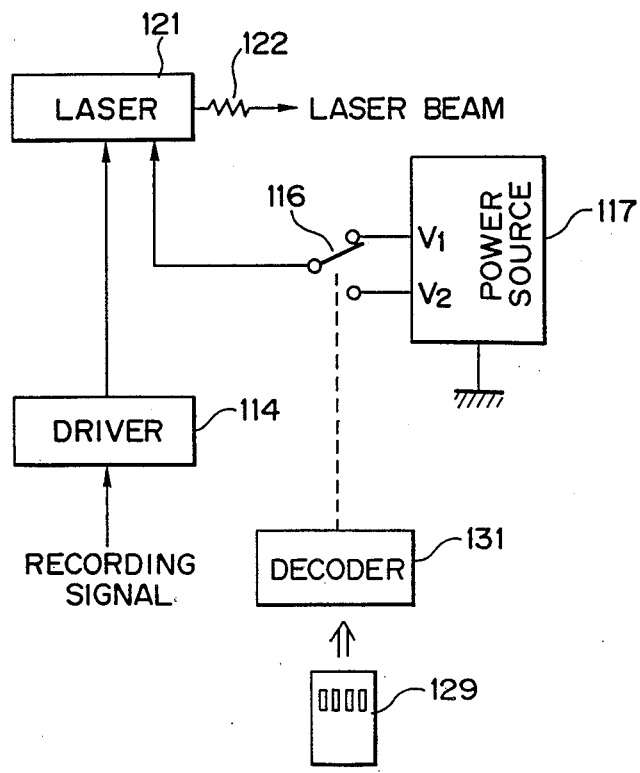
FIG. 28 is a block diagram of LBP in a seventh embodiment to which the present invention is applied.

FIG. 28 shows an example in which the strength of the laser beam is selected under the stationary conditions of the development bias in the laser beam printer in the embodiment shown in FIG. 26 in correspondence with the type of the character font concerned. A voltage V1 or V2 is selectively applied to the semiconductor laser 121 from the power source 117 through the switch 116. On the other hand, the recording signal transmitted from the signal line 171 is applied to the semiconductor laser 121 through a driver 114 so that a source voltage is applied to the laser in correspondence with the recording signal. Since the strength of the laser beam depends upon the driving voltage, the strength of the laser beam can be controlled by controlling the discriminator 131 using the switch 116 in correspondence with the character font. For example, in the case of a Ming-type recording signal, the voltage V1 of the power source 117 is selected by the switch 116 and is applied to the semiconductor laser 121. The application of the voltage is turned on or off using the signal output from the driver 114 so that the laser is turned on or off. When the light is emitted from the layer using the voltage V1, the photosensitive drum is exposed to the light with a quantity of 1.6 $\mu J/cm^2$ (an example), and the light portion potential on the photosensitive drum is −150 V, as shown in FIG. 31.

On the other hand, in the case of a Gothic-type recording signal, the voltage V2 of the power source 117 is selected by the switch 116 and is applied to the laser 121. In this case, the photosensitive drum is exposed to light with a quantity of 2.28 $\mu J/cm^2$ (an example), and the light portion potential is −100 V, as shown in FIG. 31.

FIG. 31 shows a characteristic curve LP which represents the relationship between the quantity of the laser beam applied and the potential of the photosensitive drum. As can be seen from FIG. 31, the potential of the photosensitive drum can be controlled by controlling the strength of the laser beam applied thereto, as described above. In this case, the dc component of the development bias voltage is −500 V, the ac component Vpp is 1600 V, and the frequency f=1800 Hz.

Figure 37B:
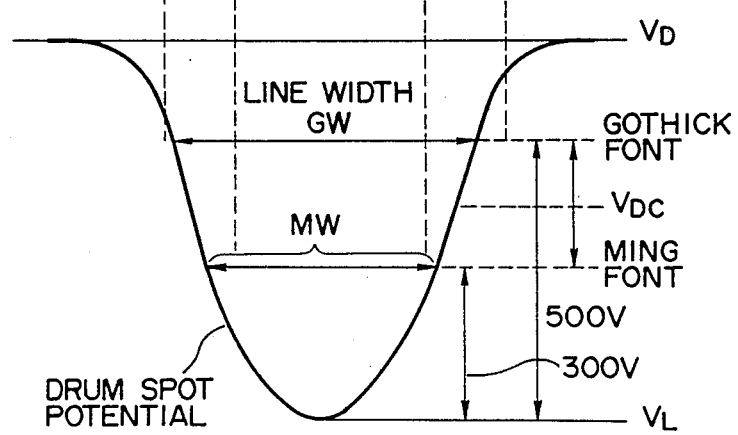

The method of changing the latent image potential has the two following advantages:

One of the advantages is that the line width can be changed efficiently. FIG. 37(a) shows the characteristic curve M of the Ming font and the characteristic curve G of the Gothic font, as well as showing the change in the Gothic font stroke width GW and the Ming font stroke width MW produced when the light portion potential $V_L$ is changed by 50 V. FIG. 37(b) shows a characteristic curve representing the change in the stroke width when the development voltage $V_{DC}$ is changed, as well as showing that a Gothic-type stroke width GW and a Ming font stroke width MW can be obtained. It is found from these two drawings that the latent image potential has an effect on the stroke width which is greater than the development voltage.

The other advantage is that there is no danger of positive fogging occurring. In the case of reversal development, if the difference between the dark portion potential and the development bias voltage is too large, toner particles electrified to a low degree and electrified to the reverse polarity adhere to the dark portion on the photosensitive drum and thus cause fogging to appear on the image formed.

In the above-described embodiment shown in FIG. 28, since only the light portion potential is changed, if the development bias is previously fixed to a value which permits no fogging to occur, the line concerned can be printed with a thickness conforming to the font by changing the thickness of the line.

(Embodiment 8)

In a laser beam printer, each of characters is recorded in the form of an assembly of dots, and the thickness of a line may be controlled to conform to the font thereof by changing the size of one dot by changing the light emission time of one dot. For example, as shown in FIG. 29, the recording signal is applied to the semiconductor laser 121 through a driver 114, and the voltage applied to a power source 117a is applied to the laser 121 in correspondence with the recording signal so that the semiconductor laser 121 can be driven in correspondence with the recording signal. To the driver 141 is applied a clock A or a clock B through a switch 118. When the recording signal shown in FIG. 30a and the clock A shown in FIG. 30b are applied to the driver 141, the laser beam shown in FIG. 30c is emitted from the semiconductor laser 121. When the clock B shown in FIG. 30d is applied to the driver 141, the laser beam shown in FIG. 30e is emitted from the semiconductor laser 121. As can be seen from comparison between the FIGS. 30c and 30e, the time taken for radiating the laser is controlled in correspondence with the width of the clock concerned. The embodiment is therefore so configured that, if a Ming-type font cartridge is detected by the decoder 131, the clock A is selected, and if a Gothic-type font cartridge is detected by the decoder 131, the clock B is selected, whereby the thickness of a line can be controlled in correspondence with the relevant font. In this case, the method can be used within the region of the photosensitive drum where the light portion potential is saturated with a quantity of laser beam of 2.8 $\mu J/cm^2$ or more. This method is excellent with respect to its environmental stability and durability, as compared with the above-described method in which the thickness of a line is changed by using the laser power.

In the above-described embodiment, the members denoted by the same reference numerals as those described above have the same functions.

Figure 33:
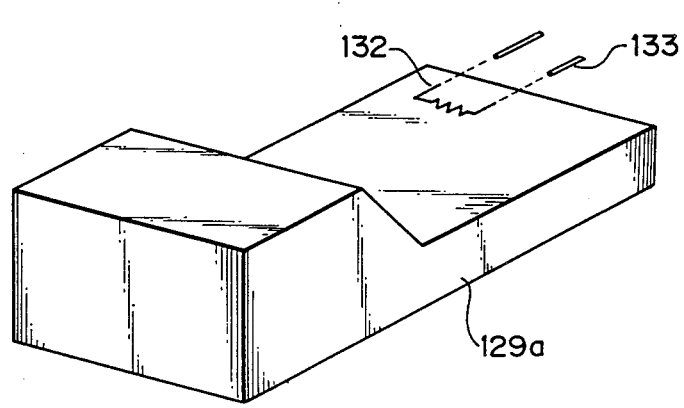
FIG. 33 is a perspective view of another embodiment of a font cartridge.

In addition, the font cartridge 129a shown in FIG. 33 may be used in place of the font cartridge 129 used in the above-described embodiment. In this case, resistance 132 is provided on each font cartridge 129a so as to be connected to the pins 133 provided on the body side when mounted on the body 170. A supply source for the laser 121 is connected in series to the pins 133 so that the strength of the laser beam can be changed by changing the value of current passing through the laser using the resistance value thereof.

The development conditions may also be changed by connecting the pins 133 provided on the body to the development bias source.

Figure 35:
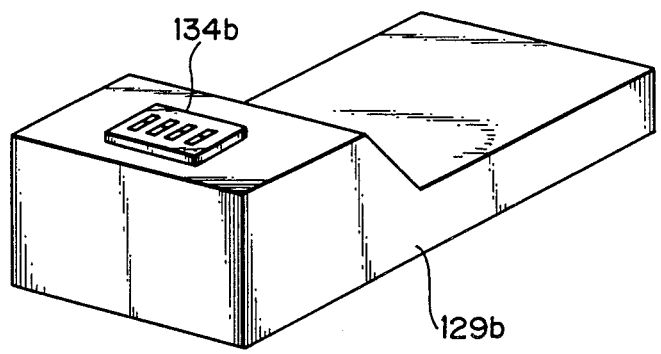
FIG. 35 is a perspective view of a further embodiment of a font cartridge.

In addition, the font cartridge 129b shown in FIG. 35 may be used in place of the font cartridge 129 used in the embodiment shown in FIG. 26. In the font cartridge 129b, four dip switches 134b may be provided in a portion thereof so that each of the switches is set to a given state corresponding to the type of the character font, the given state being incorporated into the body 120 through a connector (not shown).

Figure 36:
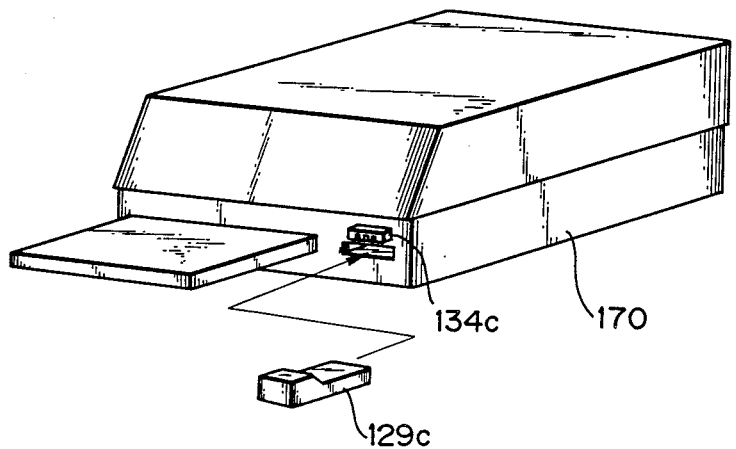

Such dip switches 134c are, like dip switches 134b not provided on a font cartridge 129c but are provided on a portion of a body 120, as shown in FIG. 36, so that information with respect to the character font can be input to the body in correspondence with the font cartridge used by setting the switches in correspondence with the character font.

Furthermore, there has recently been a method in which a character font is stored in mask ROMs or laser disks. In such a method, data with respect to character font, as well as data with respect to control of the strength of light emitted from the laser and control of factors such as the development bias voltage and so on which control the line width, may be stored, and a cartridge may be mounted on a printer, as well as such control data may be read out and used for controlling the printer.

Such a method in which control data is read out enables the shapes of cartridge packages to be made uniform and thus has an advantage in that an attempt can be made to use a common cartridge. In addition, since there is no need for use of the microswitch 131 on the body, the mechanism is simple, and the production cost can be reduced.

It is also possible to store a plurality of character fonts in a single font cartridge by storing the control data together with the character data. In this case, as in the embodiment shown in FIG. 29, control data used for determining the thickness of a line in correspondence with the character font may also be stored and read out by using the signal from the printer body or the host side of the printer to be used for controlling the printer.

Although each of the above-described embodiments concerns LBP, the present invention can also be applied to LED printers using an electrophotographic process in which emission of light from a plurality of LEDs which arranged in lines is controlled by using recording information on the basis of the same idea as that of each of the above described embodiments.

As described above, when the stroke width of a input signal is recognized, and an image forming process is controlled in correspondence with the stroke width, it is possible to improve the quality of the image formed as the final image. It is particularly possible to prevent any increase in the width of a fine line and made it close to the ideal width.

The change of an electrophotographic process in correspondence with the type of the character font used enables an optimum stroke width corresponding to the type of each character font and thus the formation of a high quality character image.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus comprising:
    image forming means for forming a visible image in correspondence with output information;
    bit map memory means for storing said output information;
    recognition means for recognizing the stroke width of said output information stored in said bit map memory means; and
    control means for controlling said image forming means in correspondence with the recognition output from said recognition means.

2. An image forming apparatus according to claim 1, wherein said recognition means for recognizing said stroke width comprises measurement means for measuring stroke widths of plural line images contained in said output information and decision means for deciding the frequencies of said stroke widths, and said recognition means recognizes the stroke width based on said decision means.

3. An image forming apparatus according to claim 1, wherein said recognition means for recognizing said stroke width comprises measurement means for measuring stroke widths of plural line images contained in said output information and average calculation means for determining an average of said stroke widths from the calculated values, said average being output as the stroke width recognized.

4. An image forming apparatus in which a visible image is formed in correspondence with output information in an image forming process for forming an electrostatic latent image of said information on a photosensitive body and developing said electrostatic latent image, said apparatus comprising:
    electrifying means for electrifying said photosensitive body;
    recognition means for recognizing the stroke width of said output information; and
    control means for controlling said electrifying means in correspondence with the recognition output from said recognition means.

5. An image forming apparatus in which a visible image is formed in correspondence with output information in an image forming process for forming an electrostatic latent image of said information on a photosensitive body and developing said electrostatic latent image, said apparatus comprising:
    developing means for developing said electrostatic latent image;
    recognition means for recognizing the stroke width of said output information; and
    control means for controlling said developing means in correspondence with the recognition output from said recognition means.

6. An image forming apparatus comprising:
    image forming means for forming a visible image in correspondence with output information;
    recognition means for recognizing a representative line width from among plural lines included in a page; and
    control means for controlling said image forming means in correspondence with the recognition output from said recognition means.

7. An image forming apparatus according to claim 6, wherein said image forming means is provided with means for forming an electrostatic latent image on a photosensitive body by exposing said photosensitive body in accordance with said output information.

8. An image forming apparatus according to claim 7 wherein said image forming means is further provided with means for electrifying said photosensitive body; and
    said control means controls the quantity of charge used for electrifying said photosensitive body.

9. An image forming apparatus according to claim 7, wherein said image forming means is provided with means for exposing said photosensitive body; and
    said control means controls the quantity of light used for exposing said photosensitive body.

10. An image forming apparatus according to claim 7, wherein said image forming means is provided with means for exposing said photosensitive body; and
    said control means controls the exposure time of said photosensitive body.

11. An image forming apparatus comprising:
    image forming means for forming a visible image in correspondence with output information;
    recognition means for recognizing the font to be output; and
    control means for controlling said image forming means in correspondence with the recognition output from said recognition means.

12. An image forming apparatus according to claim 11, wherein said image forming means is provided with means for forming an electrostatic latent image on a photosensitive body by exposing said photosensitive body in accordance with said output information.

13. An image forming apparatus according to claim 12, wherein said image forming means is further provided with means for electrifying said photosensitive body; and
    said control means controls the quantity of charge used for electrifying said photosensitive body.

14. An image forming apparatus according to claim 12, wherein said image forming means is provided with means for exposing said photosensitive body; and
    said control means controls the quantity of light used for exposing said photosensitive body.

15. An image forming apparatus according to claim 12, wherein said image forming means is provided with means for exposing said photosensitive body; and
    said control means controls the exposure time of said photosensitive body.

16. An image forming apparatus comprising:
    image forming means for forming a visible image in correspondence with output information;
    discrimination means for discriminating the types of characters to be output; and
    control means for controlling said image forming means in correspondence with the discrimination output from said discrimination means.

17. An image forming apparatus according to claim 11, wherein said recognition means is provided with a switch which operates according to a loaded font cartridge, and wherein said recognition means recognizes the font to be output on the basis of the switch.

18. An image forming apparatus according to claim 16, wherein said image forming means is provided with means for forming an electrostatic latent image on a photosensitive body by exposing said photosensitive body in accordance with said output information.

19. An image forming apparatus according to claim 18, wherein said image forming means is provided with means for exposing said photosensitive body; and wherein
said control means controls the exposure time of said photosensitive body.

20. An image forming apparatus according to claim 19 wherein said discrimination means has a switching means which operates according to an inserted font cartridge; and wherein
said discrimination means discriminates the type of characters on the basis of the switch.

21. An image forming apparatus according to claim 17, wherein said image forming means is further provided with means for electrifying said photosensitive body; and
said control means controls the quantity of charge used for electrifying said photosensitive body.

22. An image forming apparatus according to claim 17, wherein said image forming means is provided with means for developing said electrostatic latent image; and
said control means controls the development bias of said electrostatic latent image.

23. An image forming apparatus according to claim 17, wherein said image forming means is provided with means for exposing said photosensitive body; and
said control means controls the quantity of light used for exposing said photosensitive body.

24. An image forming apparatus comprising:
font data generating means for generating font data in response to input data;
processing means for forming an image on a recording medium in accordance with font data generated by said font data generating means; and
controlling means for controlling a process condition of said processing means in accordance with a kind of font to be used.

25. An image forming apparatus according to claim 24, wherein said processing means is provided with latent image producing means for producing latent image on the recording medium which is exposed according to font data.

26. An image forming apparatus according to claim 25, wherein said processing means is further provided with developing means for visualizing latent images produced on said recording medium, and said controlling means is adapted to control developing conditions for said developing means.

27. An image forming apparatus according to claim 25, wherein said processing means is further provided with electrifying means to electrify said photosensitive body, and said controlling means is adapted to control processing conditions of said electrifying means.

28. An image forming apparatus according to claim 25, wherein said controlling means is adapted to control processing conditions of said latent image producing means.

29. An image forming apparatus according to claim 24, wherein said font data generating means is provided with memory means which stores font data therein.

30. An image forming apparatus according to claim 24, wherein said data generating means is provided with a font cartridge.

31. An image forming apparatus according to claim 24, wherein said controlling means is provided with discrimination means for discriminating fonts using the type of font data.

32. An image forming apparatus according to claim 30, wherein said controlling means is provided with detection means for detecting type of font cartridge used.

33. An image forming apparatus according to claim 29, wherein said controlling means stores data for processing conditions as well as font data, and said controlling means is adapted to read the data for processing conditions out of said memory means, thereby controlling processing conditions of said processing means.

34. An image forming apparatus according to claim 12, wherein said image forming means is further provided with developing means for developing said electrostatic image; and
said control means controls said developing means in accordance with said font to be output.

35. An image forming apparatus according to claim 11, wherein said controlling means is provided with detection means for detecting type of font cartridge used.

36. An image forming apparatus according to claim 16, wherein said controlling means is provided with discrimination means for discriminating fonts using the type of font data.

37. An image forming apparatus according to claim 36, wherein said discrimination means is provided with a switch which operates in conformity with the loaded font cartridge, and said discrimination means discriminates the type of characters to be output on the basis of the switch.

38. An image forming apparatus according to claim 6, wherein said recognition means is provided with a bit map memory which stores at least one page information, and wherein said recognition discrimination a line width based on an output produced by said recognition means.

39. An image forming apparatus according to claim 6, wherein said recognition means recognizes a line width of representative line from a histogram of stored line images.

40. An image forming apparatus according to claim 6, wherein said recognition means recognizes a line width by detecting a maximum frequency among a plurality of line images.

41. An image forming apparatus according to claim 6, wherein said recognition means recognizes a representative stroke width by obtaining mean value of plurality of line images.

42. An image forming apparatus according to claim 7, wherein said image forming means is provided with developing means for developing said electrostatic latent image; and wherein
said control means controls said developing means in correspondence with the recognition output from said recognition means.

43. An image forming apparatus according to claim 1, wherein said image forming means is provided with means for forming an electrostatic latent image on a photosensitive body by exposing said photosensitive body in accordance with said output information.

44. An image forming apparatus according to claim 43, wherein said image forming means further provides with developing means for developing latent image produced on said photosensitive body, and said controlling means is adapted to control said developing means.

45. An image forming apparatus according to claim 43, wherein said image forming means further comprises an electrifying means for charging said photosensitive body, and said controlling means is adapted to control said electrifying means.

46. An image forming apparatus according to claim 4, wherein said recognition means is provided with a bit map memory which stores at least one page information, and wherein said recognition means discriminates a line width based on an output produced by said recognition means.

47. An image forming apparatus according to claim 4, wherein said recognition means recognizes a line width of a representative line from a histogram of stored line images.

48. An image forming apparatus according to claim 4, wherein said recognition means recognizes a line width by detecting a maximum frequency among a plurality of line images.

49. An image forming apparatus according to claim 4, wherein said recognition means recognizes a representative stroke width by obtaining mean value of a plurality of line images.

50. An image forming apparatus according to claim 4, wherein said control means is adapted to control said electrifying means so as to control potential of said photosensitive body.

51. An image forming apparatus according to claim 50, wherein said control means is provided with discrimination means to discrimination stroke width to make higher the potential of said photosensitive body when the stroke width is discriminated narrow, and to hold the potential constant when the discriminated stroke width is wider than a threshold value.

52. An image forming apparatus according to claim 5, wherein said recognition means is provided with a bit map memory which stores at least one page information, and wherein said recognition means discriminates a line width based on an output produced by said recognition means.

53. An image forming apparatus according to claim 3, wherein said recognition means recognizes a line width of a representative line from a histogram of stored line images.

54. An image forming apparatus according to claim 5, wherein said recognition means recognizes a line width by detecting a maximum frequency among a plurality of line images.

55. An image forming apparatus according to claim 5, wherein said recognition means recognizes a representative stroke width by obtaining mean value of a plurality of line images.

56. An image forming apparatus according to claim 5, wherein said control means is adapted to control a development bias of said developing means.

57. An image forming apparatus according to claim 56, wherein said control means is provided with discriminating means to discriminate stroke width to make the development bias low when the stroke width is discriminated narrow, and to hold said development bias constant when the discriminated stroke width is wider than a threshold value.

58. An image forming apparatus according to claim 1, wherein said recognition means is adapted to recognize a representative stroke width of line images included in said output information.

* * * * *

UNITED STATES PATENT AND TRADEMARK OFFICE
CERTIFICATE OF CORRECTION

PATENT NO. : 4,965,747

DATED : October 23, 1990

INVENTOR(S) : YASUMASA OHTSUKA ET AL.

It is certified that error appears in the above-identified patent and that said Letters Patent is hereby corrected as shown below:

ON THE TITLE PAGE,

AT [57] ABSTRACT

Line 6, "dram," should read --drum,--.

COLUMN 6

Line 41, "stroke width (L,)" should read --stroke width (L')--.
    Line 44, "dip, the L, value" should read --dip, the L' value--.

COLUMN 7

Line 12, "thusob" should read --thus-ob---.
    Line 15, "φ100 V." should read ---100 V.--.
    Line 35, "to" should be deleted.

COLUMN 8

Line 9, "stroke width L," should read --stroke width L'--.
    Line 35, "in" should be deleted.
    Line 40, "abovede-" should read --above-de---.

COLUMN 10

Line 33, "pre. exposure lamp 109," should read --pre-exposure lamp 109,--.
    Line 38, "-700" should read ---700 V--.

COLUMN 12

Line 43, "layer" should read --laser--.

UNITED STATES PATENT AND TRADEMARK OFFICE
CERTIFICATE OF CORRECTION

PATENT NO. : 4,965,747

DATED : October 23, 1990

INVENTOR(S) : YASUMASA OHTSUKA ET AL.

It is certified that error appears in the above-identified patent and that said Letters Patent is hereby corrected as shown below:

COLUMN 14

Line 62, "made" should read --make--.

COLUMN 18

Line 34, "recognition discrimination" should read
        --recognition means discriminates--.

Line 62, "further provides" should read
        --is further provided--.

COLUMN 19

Line 29, "discrimination" should read --discriminate--.

COLUMN 20

Line 7, "claim 3," should read --claim 5,--.

Signed and Sealed this

Eleventh Day of August, 1992

*Attest:*

DOUGLAS B. COMER

*Attesting Officer*      *Acting Commissioner of Patents and Trademarks*